(12) United States Patent
Schirle et al.

(10) Patent No.: US 8,266,901 B2
(45) Date of Patent: Sep. 18, 2012

(54) AXIAL THRUST OFFLOADING DEVICE

(75) Inventors: Hans Schirle, Stimpfach (DE); Hartmut Graf, Urbach (DE); Michael Rosovits, Crailshelm (DE)

(73) Assignee: Voith Patent GmbH, Heidenheim (DE)

( * ) Notice: Subject to any disclaimer, the term of this patent is extended or adjusted under 35 U.S.C. 154(b) by 1041 days.

(21) Appl. No.: 12/209,997

(22) Filed: Sep. 12, 2008

(65) Prior Publication Data
US 2009/0074561 A1    Mar. 19, 2009

(30) Foreign Application Priority Data
Sep. 13, 2007 (DE) .......................... 10 2007 043 764

(51) Int. Cl.
*F16D 33/00* (2006.01)
(52) U.S. Cl. .......................................... 60/338
(58) Field of Classification Search ............ 60/330, 60/338; 384/113, 121, 123
See application file for complete search history.

(56) References Cited

U.S. PATENT DOCUMENTS

| | | | |
|---|---|---|---|
| 3,635,533 A * | 1/1972 | Galloway | 384/121 |
| 4,209,207 A * | 6/1980 | Schippers et al. | 384/123 |
| 4,660,995 A * | 4/1987 | Kraus | 384/121 |
| 4,884,942 A | 12/1989 | Pennink | |
| 6,851,862 B2 * | 2/2005 | Gozdawa | 384/121 |

FOREIGN PATENT DOCUMENTS

| | | |
|---|---|---|
| DE | 1709611 | 10/1955 |
| DE | 1453787 | 5/1969 |
| DE | 10005309 A1 | 11/2000 |
| EP | 0461131 B1 | 12/1991 |
| JP | 9-170401 | 12/1995 |

* cited by examiner

*Primary Examiner* — Michael Leslie
(74) *Attorney, Agent, or Firm* — Greer, Burns & Crain, Ltd.

(57) ABSTRACT

An axial thrust offloading device for axial thrust balance of a machine shaft including a thrust balance ring with a supply channel for a pressurized medium opening into an annular space on the ring's face, first and second side disks disposed axially adjacent to and on opposed sides of the ring and forming first and second pressure chambers closed off on an exit flow inside by a labyrinth seal and on an inlet flow side to a pressurized medium via first and second restrictor locations, and a disk-shaped restrictor element disposed in the annular space, wherein relative axial movement between the ring and the restrictor element provides for reciprocal opening of the first and second restrictor locations to form a pressure difference between the first and second chambers.

2 Claims, 1 Drawing Sheet

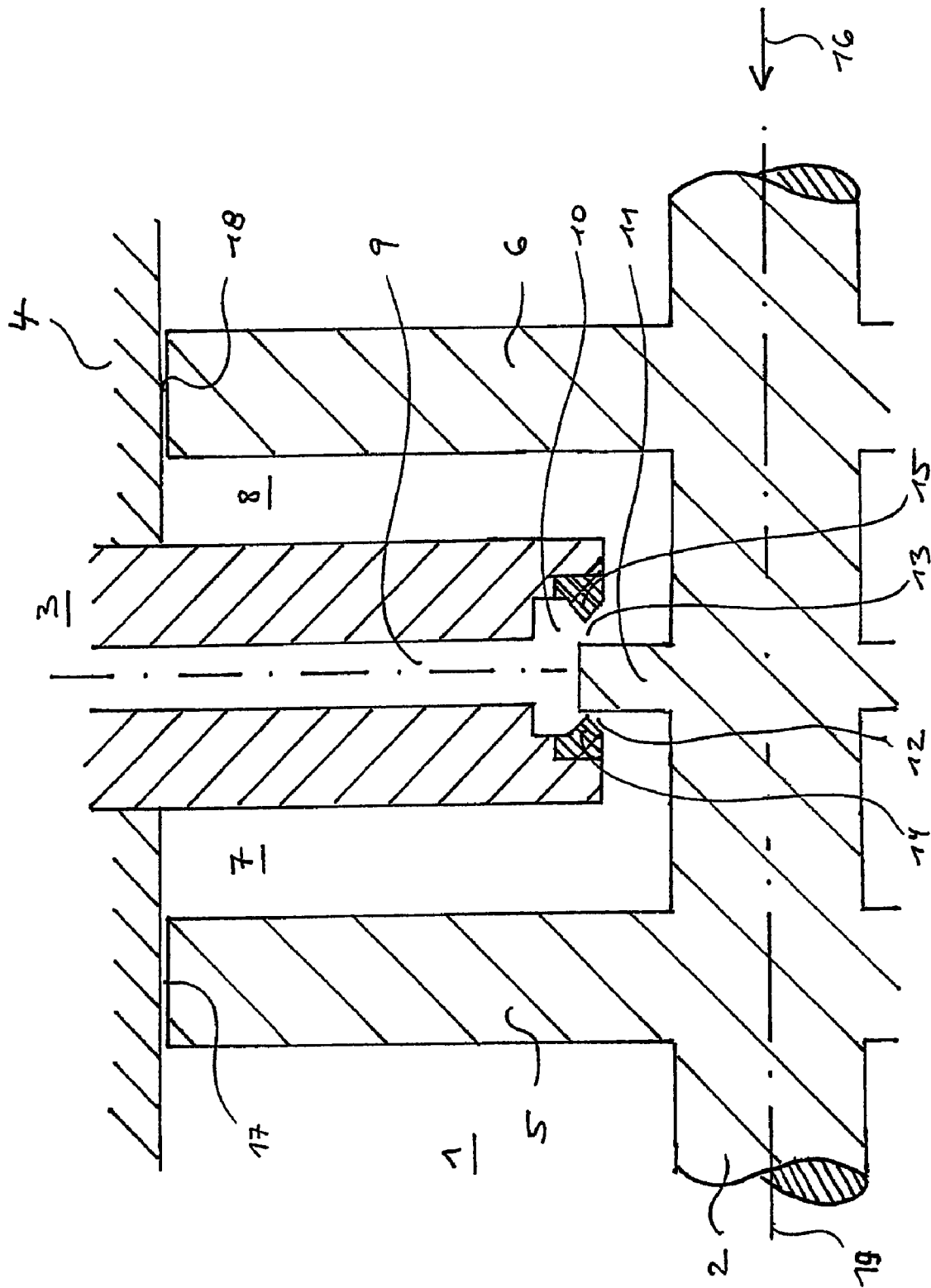

AXIAL THRUST OFFLOADING DEVICE

The invention concerns an axial thrust offloading device and in particular its application in a controllable drive train with a hydrodynamic component.

Various configurations of axial thrust offloading devices for the offloading of axial bearings of a machine shaft for pumps and turbomachinery are of known art. Here the offloading elements can be designed to be disk-shaped or piston-shaped, and have an assigned pressure chamber, in which by means of a control unit a pressure is built up that acts against the axial thrust. In such a manner actively controlled axial thrust offloading devices are, for example, disclosed by U.S. Pat. No. 4,884,942, JP 09170401 and DE 100 05 309.

What is disadvantageous in the exertion of a pressure force by a balancing piston by means of a closed control circuit is the design effort that is necessary in the implementation of a sensor system to determine the axial thrust, the control unit and the actuating elements that generate the counter-pressure. A passive axial thrust offloading device is therefore preferred, so that a regulation or control device can be dispensed with.

Passive systems for the uni-directional offloading of thrust are, for example, disclosed by DE 1 709 611 U and DE 1 453 787 A. From these emanate thrust balance pistons, which are designed in the form of a pressure chamber, which on its input and output sides has restrictor elements, which are reciprocally opened and closed by an axial movement of the machine shaft to be constrained. If the machine shaft, for example, moves such that the input restrictor opens and correspondingly the output restrictor closes, then the pressure drop across the restrictor element on the input side will decrease, and on the output side will increase, correspondingly the internal pressure in the pressure chamber increases, whereby the increasing pressure forces on the sidewalls of the pressure chamber act against the axial thrust and so guide the machine shaft back to its neutral position. However, the above-cited axial thrust offloading devices act in only one direction, so that they serve in particular for turbomachinery, such as steam turbines, in which, as dictated by the design, a uni-directional axial thrust is present.

A bi-directional passive axial thrust offloading device is disclosed by EP 0 461 131 B1, wherein this represents an axial thrust offloading device with integrated radial and axial bearings. Here the radial and/or the axial bearings serve at the same time as restrictor elements of pressure chambers, which leads to compact offloading of the bearing system and thrust. However, what is disadvantageous in such a design is that, in particular for fast running machines, because of the bearing forces that occur no freedom of adjustment of the restrictor locations is possible, resulting in a mixture of bearing support and thrust offloading that does not lead to the target of an axial thrust that preferably disappears. Moreover because of the dual function of the bearing/restrictor elements it is impossible to prevent a high volumetric flow rate of the pressurised medium through the pressure chamber, so that the pressurised medium is subject to high leakage. Accordingly to maintain the working pressure of the pressurised medium a correspondingly dimensioned pressure generation device must be provided.

The object of the invention is to specify a passive and accordingly self-adjusting axial thrust offloading device that absorbs bi-directional axial thrust forces. This should be simple in design and manufacture and should also demonstrate a high level of operational reliability. Furthermore according to a further embodiment an axial thrust offloading device is sought that is suitable for use in a controllable drive train with a hydrodynamic component, such as a hydrodynamic torque converter or a hydrodynamic clutch.

The object of the invention is achieved with the features of the independent claim 1.

The axial thrust offloading device according to the invention includes a thrust balance ring, which on both sides is adjoined by pressure chambers in the axial direction. Accordingly each of the sidewalls of the thrust balance ring essentially forms a side wall of the pressure chambers, which in what follows are designated as a first pressure chamber and a second pressure chamber. In the axial direction the other sidewalls are formed by a first side disk for the first pressure chamber and a second side disk for the second pressure chamber. According to a first form of embodiment the side disks are connected to the machine shaft such that the latter follows their axial movements. The first side disk and the second side disk are in each case preferably designed as elements that rotate with the machine shaft. The thrust balance ring is then so fitted that it does not follow the axial movements of the machine shaft, whereby the thrust balance ring preferably remains stationary. According to an alternative form of embodiment the thrust balance ring is designed to rotate with the machine shaft, and the first side disk and the second side disk are the elements that remain stationary.

Labyrinth seals in each case provide the exit flow side closure of the first pressure chamber and the second pressure chamber. These are preferably arranged on the faces of the first side disk and the second side disk respectively and extend accordingly parallel to the axial direction of the assigned machine shaft. In their sealing function these exit flow side labyrinth seals are essentially not affected by any axial movement of the machinery.

On the inlet flow side of the pressure chambers are provided a first restrictor location for the first pressure chamber and a second restrictor location for the second pressure chamber. The first restrictor location and the second restrictor location open and close reciprocally as a function of the axial movement of the thrust balance ring relative to the side disks. According to a preferred form of embodiment at least one supply channel for a pressurised medium is provided in the thrust balance ring, which opens out into an annular space, which is formed in the face on the thrust balance ring. A disk-shaped restrictor element enters into this annular space in the radial direction, which restrictor element moves together with the side disks. Accordingly the distance between a sidewall of the annular space and the opposing sidewall of the disk-shaped restrictor element will reduce because of an axial movement of the assigned machine shaft, while at the same time on the other axial face of the disk-shaped restrictor element the distance to the opposing sidewall of the annular space increases. In this region of axial relative movement are created the reciprocally opening and closing restrictor locations. Here the first restrictor location and the second restrictor location are so formed that the axial thrust offloading device is designed only for small axial oscillating movements, typically these are less than 500 μm. To this end sealing edges are in each case assigned to the first restrictor location and the second restrictor location, the profile of the edges being preferably V-shaped. Here it is possible in each case to fit a sealing edge to the sidewalls of the annular space, so that these act against the sidewalls of the disk-shaped restrictor element. Alternatively the sealing edges are assigned to the restrictor element and the sidewalls of the annular space form the corresponding opposing faces.

The first restrictor location opens and closes accordingly the connection to the first pressure chamber. The same is true for the second restrictor location, which forms a connection between the annular space and the second pressure chamber. If the restrictor locations include sealing edges, the pressure drop present at these edges alters even for small axial relative movements, so that even for small axial movements of the assigned machine shaft a sufficient pressure difference arises between the first pressure chamber and the second pressure chamber. Here it is not necessary for the machine shaft to rotate. Instead the differential pressures necessary for the axial thrust balance are created in the pressure chambers by a movement of the disk-shaped restrictor element out of the neutral position in the axial direction.

A preferred application of the axial thrust offloading device according to the invention exists for machines, which include a machine shaft that is connected to a hydrodynamic component. A hydrodynamic torque converter or a hydrodynamic clutch in particular come into consideration as a hydrodynamic component. During operation of the hydrodynamic component the working medium that flows into the former is circulated and leaves the working space under pressure, whereby the flow usually passes through a cooling device before it is recirculated. The working medium under pressure can be supplied directly to the axial thrust offloading device as a pressurised medium. Such an application of the axial thrust offloading device according to the invention is therefore particularly advantageous, since because of the reciprocally acting restrictor locations provided on the inlet side, and the constant restrictions provided on the exit flow side of the pressure chambers in the form of labyrinth seals, the volumetric flow rate of the pressurised medium through the pressure chambers is small. Moreover because of the dual-sided arrangement of the pressure chambers it is just the differential pressure between the first pressure chamber and the second pressure chamber that is relevant in the implementation of a thrust balance, so that even fluctuations of the pressure of the pressurised medium do not impair the function of the axial thrust offloading device according to the invention. Accordingly the working medium of the hydrodynamic component can advantageously be used, which depending on the operational situation of the hydrodynamic component can be subject to pressure fluctuations. Furthermore the axial thrust offloading device according to the invention can be used for other machines, such as gearboxes, in which axial thrust forces are to be constrained.

In what follows the invention is described in more detail with the aid of a figure. In the latter the following is individually represented:

FIG. 1 shows an axial section for a preferred form of embodiment of the axial thrust offloading device according to the invention.

In FIG. 1 the axial thrust offloading device 1 according to the invention is represented as an axial section along the longitudinal axis of a machine shaft 19, wherein the representation in the figure shows only one of the two symmetrical halves.

The axial thrust offloading device 1 according to the invention is arranged as a separate component along a machine shaft 2, wherein the axial thrust offloading device 1 as seen in the traction direction can be provided in front of or behind the machine component generating the axial thrust.

What is applied is a passive, self-adjusting system, for which two component groups are provided that can be axially displaced relative to one another, wherein axial thrust balance forces result from a relative axial movement of the two component groups.

For the present form of embodiment a thrust balance ring 3 is used that is fixed to a stationary part 4, to which ring are adjoined at either side a first pressure chamber 7 and a second pressure chamber 8. The outer side faces of the thrust balance ring 3 in each case accordingly represent one of the two sidewalls for the first pressure chamber 7 and the second pressure chamber 8. The other sidewall is formed by an axial side face of a first side disk 5 for the first pressure chamber 7 and a second side disk 6 for the second pressure chamber 8. The first side disk 5 and the second side disk 6 are attached to the machine shaft 2, or are designed in one piece with the latter, such that they follow the movements of the machine shaft 2. As a result of the axial thrust 16, indicated by means of an arrow, the first side disk 5 and the second side disk 6 move synchronously in the axial direction relative to the thrust balance ring 3. The sealing function of the first labyrinth seal 17 provided on the face of the first side disk 5 is essentially unaffected by this axial relative movement. The same is true for the second labyrinth seal 18, which is assigned to the second side disk 6 and thus to the second pressure chamber 8. Since the restrictor effect created by the first and the second labyrinth seals 17, 18 remains essentially constant a pressure difference can be generated between the first pressure chamber 7 and the second pressure chamber 8 by the reciprocal opening and closing of the inlet flow openings to the two pressure chambers 7, 8 respectively. This is effected by the form of embodiment of the first restrictor location 12 for the first pressure chamber 7 and the second restrictor location 13 for the second pressure chamber 8.

According to the advantageous form of embodiment represented in FIG. 1 a disk-shaped restrictor element 11 enters into an annular space 10, which is formed in the face of the thrust balance ring 3. This disk-shaped restrictor element 11 rotates with the machine shaft 2 and in the event of an axial relative movement between the machine shaft 2 and the stationary thrust balance ring 3 will therefore execute a corresponding axial movement in the annular space 10. Accordingly the distance between the sidewalls of the disk-shaped restrictor element 11 and the axial faces of the annular space 10 alters.

The annular space 10 is supplied with a pressurised medium by means of a supply channel 9 that is formed in the thrust balance ring 3. If on each of its sidewalls a first sealing edge 14 and a second sealing edge 15 are arranged, which have a small distance from the side faces of the disk-shaped restrictor element 11, then a first restrictor location 12 and a second restrictor location 13 are created, which reciprocally open and close as a result of a relative axial movement between the disk-shaped restrictor element 11 and the thrust balance ring 3. By means of these relative movements a variable pressure drop is created at the first restrictor location 12 and the second restrictor location 13. Correspondingly with an out-of-centre position of the disk-shaped restrictor element 11 within the annular space 10 a pressure difference will be created between the first pressure chamber 7 and the second pressure chamber 8. Because of the essentially similar areas of the axial faces of the first side disk 5 and the second side disk 6 facing towards the pressure chambers an axial force results from this pressure difference that acts against the axial thrust 16.

The first restrictor location 12 and the second restrictor location 13 can have different configurations. In the present case the sealing edges 14 and 15 are assigned to the sidewalls of the annular space 10. Alternatively the sealing edges can be arranged on the disk-shaped restrictor element 11, or the axial side faces facing each other of the annular space 10 and the disk-shaped restrictor element 11 can be configured in a complementary manner in such a way that a variable restrictor effect results in the event of a relative axial movement.

According to an advantageous form of embodiment the sealing edges 14 and 15 corresponding to the representation in FIG. 1 are designed as separate components that are connected to the inner walls of the annular space 10. In the simplest case this connection is made by means of an attachment element, for example by a screw fitting. Alternatively a friction-locked connection can be created by means of an interference fit assembly.

The distances shown in FIG. 1 between the sealing edges 14, 15 and the side faces of the disc-shaped restrictor element 11 facing towards them are exaggerated for purposes of a better understanding. For the axial thrust offloading device 1 according to the invention only a small oscillating axial travel is preferably allowed, so that the movement in the axial direction of the machine shaft 2 relative to the stationary thrust balance ring 3 is limited to less than 1 mm, and preferably to less than 500 µm. Correspondingly the distances between the sealing edges 14, 15 and the sidewalls of the disk-shaped restrictor element 11 are designed as small clearances. The first labyrinth seal 17 and the second labyrinth seal 18 are adapted so as to match up to these clearances in terms of their constant restrictor effect. Here it is to be noted that as a result of the rotational movements of the first side disk 5 and the second side disk 6 with a rotating machine shaft 2 the pressurised medium inside the first pressure chamber 7 and the second pressure chamber 8 is likewise set into rotation, so that the pressure rise resulting from this rotation is likewise to be taken into account in the design of the labyrinth seals 17 and 18 as well as the first restrictor location 12 and the second restrictor location 13.

The above-represented preferred form of embodiment of the invention assumes a stationary thrust balance ring 3. This leads to an arrangement in which the first restrictor location 12 and the second restrictor location 13 lie radially within the first labyrinth seal 17 and the second labyrinth seal 18. Accordingly the inlet flow side that provides the pressure adaptation lies at a smaller radius compared with the exit flow side, which leads to a smaller relative velocity in the circumferential direction within the first restrictor location 12 and/or the second restrictor location 13 in comparison with the labyrinth seals 17, 18 on the exit flow side. This is advantageous compared with the alternative form of embodiment, in which the thrust balance ring 3 rotates with the machine shaft 2, while the first side disk 5, the second side disk 6 and the disk-shaped restrictor element 11 are stationary.

A further form of embodiment of the invention is particularly preferred, in which the working medium of a further machine component under pressure is used as the pressurised medium. Accordingly a preferred application of the axial thrust offloading device 1 according to the invention exists for machines that include a hydrodynamic component, such as a hydrodynamic torque converter or a hydrodynamic clutch. For this case, not represented in detail in FIG. 1, a working medium line for the hydrodynamic component can be directly connected to the supply channel 9. The pressure force exerted by the pressurised medium is then created directly by the operation of the hydrodynamic component, wherein as a result of the differential pressure principle pressure fluctuations do not lead to any impairment of the thrust offloading. Furthermore the axial thrust offloading device 1 according to the invention can also be used for the operational case of a non-rotating machine shaft 2.

One example for such a preferred application of the axial thrust offloading device 1 according to the invention is accordingly a controllable drive train that includes a hydrodynamic torque converter or a hydrodynamic clutch. This can for example be a device for conversion of rotational speed or torque, in which a variable ratio gear unit of planetary design is provided. For a drive train machine rotating at constant speed the main part of the power is mechanically transferred via the planetary gearing, while a smaller part is branched off for performance and rotational speed control by means of a hydrodynamic torque converter, and is supplied via a stationary planetary gearing back to the rotating planetary gearing. For such controllable drives used in the energy industry, the oil and gas industry, the chemical industry, or in foundry technology, the hydrodynamic component generates an axial thrust that is variable in both size and direction. By means of the axial thrust offloading device 1 arranged as a separate component on the machine shaft connected to the hydrodynamic component the axial thrust can be reduced down to zero, as a result of which the axial bearings are offloaded. Furthermore the axial position of the machine shaft 2 is essentially held at a neutral point, wherein the working medium is directly supplied from the hydrodynamic component as the pressurised medium of the axial thrust offloading device 1.

REFERENCE SYMBOL LIST

1 Axial thrust offloading device
2 Machine shaft
3 Thrust balance ring
4 Stationary part
5 First side disk
6 Second side disk
7 First pressure chamber
8 Second pressure chamber
9 Supply channel
10 Annular space
11 Disk-shaped restrictor element
12 First restrictor location
13 Second restrictor location
14 First sealing edge
15 Second sealing edge
16 Axial thrust
17 First labyrinth seal
18 Second labyrinth seal
19 Longitudinal axis of the machine shaft

The invention claimed is:

1. An axial thrust offloading device for the axial thrust balance of a machine shaft (2), including:
a thrust balance ring (3) with a supply channel (9) for a pressurized medium therein designed, which opens out into an annular space (10) on the face on the thrust balance ring (3);
a first side disk (5) and a second side disk (6), which in each case are arranged to be axially adjacent to, and on opposite sides of, the thrust balance ring (3) such that a first pressure chamber (7) and a second pressure chamber (8) are created, wherein the first pressure chamber (7) and the second pressure chamber (8) on the exit flow side are in each case closed off by means of a labyrinth seal (17, 18), and on the inlet flow side a connection in each case exists to the annular space (10) for the inflow of a pressurized medium, via a first restrictor location (12) for the first pressure chamber (7) and a second restrictor location (13) for the second pressure chamber (8); and
a disk-shaped restrictor element (11) entering into the annular space (10);
wherein the thrust balance ring (3) and the restrictor element (11) are so arranged that one of the two components is stationary in the axial direction and the other component follows an axial movement of said machine shaft (2), wherein by means of a relative axial movement between the thrust balance ring (3) and the restrictor element (11) the first restrictor location (12) and the second restrictor location (13) are reciprocally opened and closed, so that a pressure difference is created between the first pressure chamber (7) and the second pressure chamber (8).

2. The axial thrust offloading device according to claim 1, characterized in that the first side disk (5) and the second side disk (6) and the disk-shaped restrictor element (11) rotate with the machine shaft (2), and the thrust balance ring (3) is designed to be stationary.

* * * * *